United States Patent Office 3,507,580
Patented Apr. 21, 1970

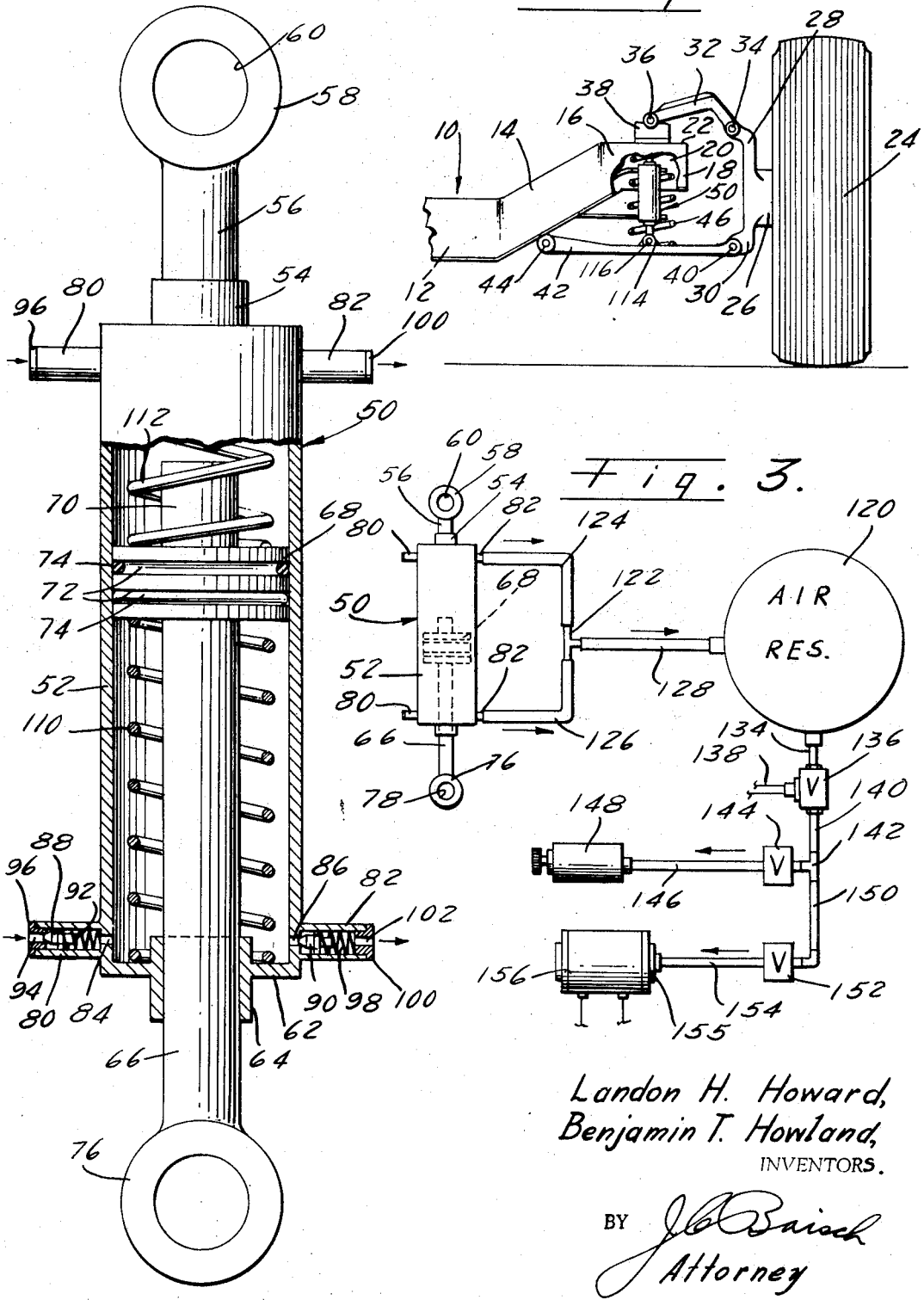

3,507,580
ENERGY GENERATOR
Landon H. Howard, 2841 Monogram Ave. 90815, and Benjamin T. Howland, 3912 Canehill Ave. 90808, both of Long Beach, Calif.
Filed May 12, 1967, Ser. No. 638,115
Int. Cl. F04b 35/02
U.S. Cl. 417—231                                      1 Claim

ABSTRACT OF THE DISCLOSURE

Energy generating apparatus having relatively movable pump parts operably mountable between vehicle parts having relative vertical movement whereby the pumping apparatus is operated to supply pressure fluid for operating fluid pressure operable means.

BACKGROUND OF THE INVENTION

While the present invention has particular utility on connection with the provision of an auxiliary power or energy source for operating an electrical generator or alternator or the like for putting an electrical charge into the batteries of an electric automobile or other vehicle, and is shown and described in such connection, it is to be understood that its utility is not confined thereto.

As is well known, electrically operated vehicles have certain inherent disadvantages. For one thing, the range of operation with a battery charge is considerably limited as the batteries run down rather rapidly and will then require recharging.

Heretofore, as far as we are aware, attempts to provide an auxiliary source of energy for replacing a part of the charge in the batteries as the vehicle is being used utilize some of the energy supplied by the primary power source. Such an arrangement is, of course, not satisfactory since no additional power is supplied that is not derived from said primary power source.

The present invention solves the above problems by providing means for supplying an auxiliary power or energy source that is derived from movements of the vehicle that do not depend on the driving force of the primary power source. In other words, the present invention develops auxiliary power or energy from vehicle movements that do not take power from the primary power source.

The invention may also function as the vehicle suspension system and provide a cushioning or stabilizing effect while acting as an energy generator.

An example of the prior art is disclosed in the Di Perna Patent No. 2,941,613 which discloses an air generator electric vehicle. There is a special generator adapted to apply a charge to the battery when the vehicle is in forward motion. This special generator is operated by ram pressure of air turning a vaned armature. With this arrangement there is air resistance to the auxiliary mechanism which uses some of the energy or power of the primary power source.

SUMMARY OF THE INVENTION

An energy generator embodying the present invention may be attached adjacent each wheel of the vehicle and each of these generators has two main parts, a cylinder, and a piston reciprocally mounted therein, the device being of the double acting type for pumping fluid such as air, for example. The parts are connected between parts of the vehicle that have relative vertical motion. Each end of the cylinder is provided with check valve controlled inlet and outlet the latter being adapted to be connected to a fluid reservoir in which fluid pressure is built up. Pressure fluid from the reservoir is used to drive an electric generator or alternator or the like or other vehicle accessories.

Thus, relative vertical movements of the vehicle parts to which the device is operably connected effects pumping action of the device to pump fluid into the reservoir. This relative vertical movement of the vehicle parts does not take any power from the prime power source of the vehicle and the device will function when the vehicle is operated in reverse as well as forwardly. Thus the invention makes use of hitherto ignored forces resulting from vehicle operation.

A spring is disposed at each end of the cylinder and acts on the piston. With this spring arrangement and a device for each wheel said device may serve as a part or all of the land vehicle's suspension system as well as providing an auxiliary source of energy or power.

The characteristics and advantages of the invention are further sufficiently referred to in connection with the following detailed description of the accompanying drawing which illustrate one embodiment. After considering this example skilled persons will understand that many variations may be made without departing from the principles disclosed and we contemplate the employment of any structures, arrangements or modes of operation that are properly within the scope of the appended claim.

Referring to the drawings which are for illustrative purposes only:

FIG. 1 is a front view of a portion of a vehicle diagrammatically showing a wheel supporting or suspension mechanism with the present invention operably mounted between parts of the suspension mechanism having relative vertical movements;

FIG. 2 is a diagrammatic side elevational view of an energy generator embodying the present invention, a portion being broken away and shown in section to show the interior construction; and FIG. 3 is a schematic or diagrammatic view of a pneumatic system incorporating the present invention.

Referring more particularly to the drawings, there is shown, FIG. 1, one end of a cross frame member, indicated generally at 10, of a vehicle, said cross frame member having a central, horizontal part 12, an upwardly and outwardly inclined part 14 from the upper outward end of which there is a short horizontal part 16, at least the latter being hollow with front and back walls 18 and 20 and a top wall 22.

There is a wheel with a tire 24 thereon, said wheel being operably mounted on an axle 26, the latter having an upwardly extending arm 28 and a downwardly extending arm 30, said arms 28 and 30 being integral with the axle 26 and fixed relative thereto.

The upper arm 28 has its upper free end pivotally connected to the outer end of a movable arm 32, said pivotal connection being at 34. The inner end of arm 32 is pivoted, at 36, to a support member 38 fixed in the usual well-known manner to the upper wall 22 of the outer horizontal end of the frame member 10.

Downwardly extending arm 30 of the axle is pivotally connected, at 40, to the outer end of a movable arm 42, the other, inner end of arm 42 is pivotally connected, at 44, to the upwardly and outwardly inclined part 14 of frame part 10.

A coil suspension spring 46 is operably disposed between the arm 42 and the top wall 22 of the horizontal part 16 of the frame member 10. One of the energy generating devices, indicated generally at 50, is operably disposed within the spring 46.

Referring now to FIG. 2, the device 50 comprises a cylinder 52 closed at its upper end by an upper end wall and having an upwardly extending axial boss 54 with a tapped recess, not shown, extending from the upper end wall, said recess being closed at its lower or inner end. A connecting rod 56, having an externally threaded end screwed into said tapped recess, extends upwardly from said boss and is provided with an enlarged bearing element 58 at its upper or outer free end, said bearing element 58 having a transverse bore 60 therein. It is to be understood that when terms or words indicating directions are used, they are to be taken as indicating such directions relative to the views of the drawings.

The lower or opposite end of the cylinder 52 is closed by a lower end wall 62 having an axial bearing 64 for slidable reception of a piston rod 66, said bearing 64 providing a sealing as well as a sliding support for the piston rod 66.

Piston rod 66 has a piston 68 attached thereto adjacent the upper or inner end, an end portion 70 of said piston rod extending upwardly from the piston to serve as a bumper to limit telescoping movement of the cylinder and piston. The piston may be attached to the piston rod by any suitable well-known means and said piston has a plurality of exterior annular grooves 72 for reception of piston rings 74. The piston rings may be of any suitable character but are shown as being O-rings of any suitable material, such as rubber, plastic or the like, there being various types of these rings on the market.

At its outer end the piston rod 66 is provided with an enlarged annular part or bearing element 76 having a transverse bore 78 therethrough.

Each end of the cylinder 52 is provided with an inlet duct and an outlet duct 80 and 82 respectively. The ducts 80 and 82 are connected with the interior of the cylinder by means of passages or ports 84 and 86 respectively. Suitable check valves, including movable check valve members 88 and 90 respectively, control the fluid flow through the inlets and outlets.

Check valve 84 is urged by spring 92 which are controlled by suitable check valves including movable check valve members 84 and 86 respectively. The check valve members are yieldingly urged in the closing direction by springs 88 and 90 respectively. Check valve 84 is urged by spring 88 against a seat at the inner end of a passage 94 through an insert 96 which is secured in the outer end portion of the inlet 80 by any suitable means, the insert being shown as being press fitted in said inlet although it may be threaded and screwed into a tapped end portion of said inlet.

Check valve 90 is urged by spring 98 against a seat at the outer end of the passage 86 leading from the interior of the cylinder adjacent its lower end into the outlet 82. An insert 100 similar to insert 96 is secured in the outer end of the outlet 82 and has an outlet passage 102 therethrough.

Within the cylinder are springs 110 and 112, spring 110 being disposed in the lower part of the cylinder and spring 112 being disposed in the upper part of the cylinder. Spring 110 reacts between the wall 62 at the lower end of the cylinder and the piston 68 while spring 112 reacts between the upper end wall of the cylinder and the piston.

The device 50 may be operably mounted between the lever 42 and the upper wall 22 of the transverse frame member part 16. As shown the bearing element 76 is disposed between the sides of a yoke 114 attached to the lever 42 and is pivotally connected with said sides by means of a pivot pin 116 or the like. The bearing element 58 of the cylinder is similarly connected to the wall 22 of the frame part 16.

While only one of the devices 50 is shown in FIG. 3 it is to be understood that each wheel may have such a device and each of said devices has its outlet connected to the air reservoir, indicated generally at 120. Each outlet of the device 50 is connected to a T fitting or fixture 122 by conduits 124 and 126, there being a conduit 128 connecting the T fitting with the reservoir 120.

When the vehicle is in forward or rearward motion the wheels move upwardly and downwardly with respective variations in the road and cause the suspension mechanism to be actuated to effect vertical telescoping and extending movements of the cylinders and pistons of the respective devices 50 which results in pumping of air into the reservoir and build up air pressure therein. Air, of course, is drawn into the upper and lower ends of the cylinder as the piston moves downwardly relative to the cylinder and air is drawn into the lower part of the cylinder when the cylinder and piston move telescopically. With opposite movements of the piston relative to the cylinder air is forced or pumped into the reservoir.

The reservoir may be connected with various mechanisms operable by fluid pressure or pressure air. As shown in FIG. 3 the reservoir has an outlet connection 134 with a valve 136 having a conduit 138 connected thereto leading to a device to be operated. The valve also has a connection 140 with a fitting 142 having one arm connected with a valve 144 which in turn is connected by a conduit 146 with a starter 148.

The fitting 142 also has a connection 150 with a valve 152 which in turn is connected by a conduit 154 with a pressure fluid operated turbine 155 which drives an apparatus 156 for producing or generating current. Such apparatus may be a generator or alternator or the like.

Pressure air may be supplied to the various apparatus by proper operation of the valves 136, 144 and 152. Should it be desired to provide a charge to the batteries during operation of the vehicle, the alternator is operated by pressure air from the reservoir which is constantly supplied with pressure air by the devices 50 since there is constantly relative vertical movement between the parts of the suspension system for the vehicle wheels when the vehicle is in motion so that air is constantly being pumped into the reservoir by the devices 50. Therefore there can be a constant charging of the batteries by this auxiliary energy producing apparatus which will greatly extend the range of the vehicle before the batteries require full recharging.

From the foregoing it will be apparent that the present invention utilizes vertical movement of parts of a vehicle having vertical movement relative to each other and the forces developed by such vertical movements has heretofore not been used or taken advantage of and so not use any power of the prime power source of the vehicle.

Further, with proper spring arrangements of the devices themselves the springs can function to replace in part or entirely the conventional springs and the springs of the devices may also function to cushion or stabilize the suspension action. In other words, the springs of the devices may act as shock absorbers as well as energy producing means and spring suspension means.

Also, the present invention gives feasibility to electric motor powered vehicles by extending the driving range through maintenance of the battery charge for much greater periods of time and operation of the vehicle.

It also may be used to remove some of the battery and engine load of conventional vehicles in the operation of air conditioning compressors, et cetera.

The invention and its attendant advantages will be understood from the foregoing description, and it will be apparent that various changes may be made in the form, construction and arrangement of the parts of the invention without departing from the spirit or scope thereof or sacrificing its material advantages, the arrangement hereinbefore described being merely by way of example, and we do not wish to be restricted to the specific form shown or uses mentioned except as defined in the accompanying claim.

We claim:

1. An energy generator for mounting between actuating parts adapted to have vertical movement relative to each other, comprising:

(A) pump means having a pair of cooperating pump parts effecting pumping of fluid upon relative movement of said pump parts;
(B) means for connecting the pump parts to respective actuating parts whereby, upon relative vertical movement of said actuating parts the pump parts are actuated for pumping fluid;
(C) said pump means comprises a double acting pump having a cylinder, each end of said cylinder having a check valve controlled inlet port and a check valve controlled port, said cylinder being imperforate between the ports at the ends thereof;
(D) a piston reciprocally disposed in said cylinder;
(E) a piston rod operably carrying said piston;
(F) said actuating parts for the pump being operably connected to parts of a vehicle having relative vertical movements;
(G) and yielding means in the cylinder acting between the cylinder and piston in opposite directions, said yielding means comprising springs in the upper and lower parts respectively of the cylinder and reacting against the piston in opposed and balancing relationship and serving as part of the suspension system of the vehicle, at least the spring in the lower portion of the cylinder serving to yieldingly support said vehicle.

References Cited

UNITED STATES PATENTS

| | | | |
|---|---|---|---|
| 1,247,835 | 11/1917 | Holden | 230—34 |
| 1,376,467 | 5/1921 | Simmon | 230—33 |
| 1,862,195 | 6/1932 | Newton | 230—33 |
| 1,905,941 | 4/1933 | Lansing | 290—34 |
| 2,920,211 | 1/1960 | Gotoh. | |
| 3,345,517 | 10/1967 | Smith | 290—30 |

GLEN R. SIMMONS, Primary Examiner

U.S. Cl. X.R.

248—358; 267—2, 8; 280—106.5; 290—1; 417—536